(12) United States Patent
Voss et al.

(10) Patent No.: US 9,150,057 B2
(45) Date of Patent: Oct. 6, 2015

(54) TIRE HAVING TREAD WITH HIDDEN TREAD BLOCKS

(75) Inventors: Stefan Voss, Greer, SC (US); Eric Arthur DeBenedittis, Greenville, SC (US)

(73) Assignees: COMPAGNIE GENERALE DES ESTABLISSEMENTS MICHELIN, Clermont-Ferrand (FR); MICHELIN RECHERCHE et TECHNIQUE S.A., Granges-Paccot (CH)

( * ) Notice: Subject to any disclaimer, the term of this patent is extended or adjusted under 35 U.S.C. 154(b) by 612 days.

(21) Appl. No.: 13/546,610

(22) Filed: Jul. 11, 2012

(65) Prior Publication Data

US 2013/0014873 A1    Jan. 17, 2013

Related U.S. Application Data

(60) Provisional application No. 61/507,265, filed on Jul. 13, 2011.

(51) Int. Cl.
| | |
|---|---|
| *B60C 11/12* | (2006.01) |
| *B60C 11/04* | (2006.01) |
| *B60C 11/03* | (2006.01) |
| B29D 30/06 | (2006.01) |

(52) U.S. Cl.
CPC ........... *B60C 11/042* (2013.04); *B60C 11/0309* (2013.04); *B60C 11/125* (2013.04); *B60C 11/1218* (2013.04); *B60C 11/1281* (2013.04); *B29D 2030/0613* (2013.01); *B60C 2011/0348* (2013.04); *B60C 2011/0397* (2013.04)

(58) Field of Classification Search
CPC B60C 11/03; B60C 11/0306; B60C 11/0309; B60C 11/032; B60C 11/0323; B60C 2011/0386; B60C 11/04; B60C 11/0402; B60C 11/12; B60C 11/1204; B60C 2011/1209; B60C 11/1218; B60C 11/1281
USPC .................. 152/209.18, 209.25, 209.26, 901
See application file for complete search history.

(56) References Cited

U.S. PATENT DOCUMENTS

| | | | | |
|---|---|---|---|---|
| 4,794,965 | A * | 1/1989 | Lagnier | 152/209.24 |
| 4,994,126 | A * | 2/1991 | Lagnier | 152/209.18 |
| 2003/0047263 | A1* | 3/2003 | Lopez | 152/209.22 |
| 2004/0089384 | A1* | 5/2004 | Lopez et al. | 152/154.2 |
| 2007/0095447 | A1* | 5/2007 | Nguyen et al. | 152/209.18 |
| 2007/0284026 | A1* | 12/2007 | Suzuki | 152/209.18 |

FOREIGN PATENT DOCUMENTS

WO    WO 2013/002801    * 1/2013

* cited by examiner

*Primary Examiner* — Eric Hug

(57) ABSTRACT

Tires in use wear in a host of ways. One negative manner in which tires, especially truck tires, may wear is in an irregular fashion. When this phenomenon happens, the tread of the tire may become unusable, forcing the user to replace the tire, which is undesirable. This patent application poses a new and useful way of preventing irregular wear involving the use of hidden sipes or tread blocks. In some embodiments, these hidden sipes or tread blocks are found in tread blocks or ribs adjacent other tread blocks or ribs that have been determined to be susceptible to irregular wear. In other embodiments, the hidden sipes or tread blocks are formed by a sipe blade that has a connecting member to which two y-branched members are attached, and further comprising dividing members that connect between the y-branched members.

10 Claims, 4 Drawing Sheets

TIRE HAVING TREAD WITH HIDDEN TREAD BLOCKS

PRIORITY CLAIM

This application claims the benefit of previously filed U.S. Provisional Patent Application entitled "Tire having Tread with Hidden Tread Blocks", assigned U.S. Ser. No. 61/507,265, filed Jul. 13, 2011, and which is incorporated herein by reference in its entirety for all purposes.

BACKGROUND OF THE INVENTION

1. Field of the Invention

Tires in use wear in a host of ways. One negative manner in which tires, especially truck tires, may wear is in an irregular fashion. When this phenomenon happens, the tread of the tire may become unusable, forcing the user to replace the tire, which is undesirable. This patent application poses a new and useful way of preventing irregular wear, increasing the useful life of the tire tread.

2. Description of the Related Art

Many nominally ribbed tires, such as truck steer and trailer tires for example are subject to irregular wear, which is often characterized by local depressions. Irregular wear is a frequent cause for tires to be removed from service. Accordingly, several design features have been used in the prior art to help prevent irregular wear including microsiping in the outside or shoulder areas of the ribs, providing sipes that are directionally oriented and providing for sacrificial shoulder ribs.

Yet another example of a technique used to prevent irregular wear is shown by U.S. Pat. No. 4,986,325. It discloses the use of angled grooves and sipes that are strategically positioned and sized for improving wet traction. However, this patent also suggests that placing sipes outside the center region of the tread, whith constitutes the middle 80% of the width of the tread, is disadvantageous because such placement increases the risk of heel and toe wear developing in the outer 20% of the tread found on either side of the center region of the tread, which corresponds to the shoulder regions of the tread. In particular, it recommends that sipes should not even extend partially into the shoulder regions of a tread for fear of increasing the risk of heel and toe wear (see col. 6, lines 54-59 of the '325 patent).

Another method for preventing abnormal wear is disclosed by U.S. Pat. No. 5,316,062. It suggests using sipes having different depths in the tread of tire. Specifically, it teaches decreasing the depth of the sipes such that sipes nearer the center of the tire are deeper than sipes found nearer the shoulders of the tire (see FIGS. 2 and 3 of the '062 patent).

All of these solutions found in the prior art address the need to slow down the development of irregular wear when the tire is first put into service but do little to prevent the development of irregular wear as the tire tread wears past these features. Also, they do not prevent traction losses over the life of the tire tread that occurs especially as sipes are worn away.

Accordingly, there still exists a need to prevent irregular wear as a tire tread is worn in a manner that does not lead to a compromise in traction, both at the beginning and throughout the life of the tire.

SUMMARY OF THE INVENTION

The present invention includes a tire that has circumferential, radial and axial directions and that has a tread with a plurality of ribs or tread blocks wherein one of said ribs or tread blocks has hidden sipes or tread blocks adjacent another rib or tread block that is susceptible to irregular wear or for which it is desired by the tire designer to protect from irregular wear by increasing the longitudinal force exerted on said rib or tread block. In some cases, the hidden tread blocks are formed by y-branched sipes and dividing sipes.

In another embodiment, the present invention includes a tire that has circumferential, radial and axial directions and that has a tread that comprises a plurality of ribs wherein at least one rib has a sipe that extends substantially in the circumferential direction of the tire when the tire is in an unworn state. This tire may further comprise y-branched sipes that are exposed as the tire wears. Furthermore, this tire may further comprise dividing sipes that connect from one y-branched sipe to another, forming hidden tread blocks that are exposed as the tire wears.

In some embodiments, the dividing sipes are titled slightly toward the direction circumferentially in which the tire rolls. In some cases, the angle these dividing sipes form with the radial direction of the tire is approximately 10 degrees. In other cases, the dividing sipes are spaced approximately 5 mm away from each other in the circumferential direction of the tire. In still other embodiments, the sipes are approximately 5 mm deep.

In some cases, the dividing sipes are straight while in other cases they are undulating or vary in some other manner producing an undercut in the radial direction of the tire.

In other embodiments, there would be no dividing sipes and the hidden tread block or rib would have a top surface that is recessed as compared to the other ribs. In such a case, the top surface could be recessed 1-3 mm.

In other embodiments, the depth of the tread is approximately 15 mm. In still other embodiments, the depth of the tread is approximately 10 mm.

In some embodiments, the tire is a trailer or steer axle tire for heavy trucks. In other embodiments, the tire is a light truck or passenger car tire. In still other embodiments, the tire is a drive tire for a heavy truck. In such a case, the tread depth could be greater than 15 mm.

In some cases, the tire has a plurality of ribs that run circumferentially around the tire and the tire has hidden tread blocks or hidden sipes that are found inside one or more of said ribs. In such a case, said hidden tread blocks or hidden sipes may be found within the ribs found in the middle region of the tread.

In other embodiments, the tire has five continuous ribs that run circumferentially around the tire and the hidden tread blocks or hidden sipes are located in the middle rib. In yet another embodiment, the hidden tread blocks or hidden sipes could be located in a rib that is adjacent to the shoulder rib.

The present invention also includes a sipe blade that has a connecting member, y-branching members and dividing members that connect from one y-branching member to the other y-branching member. The configuration of such a sipe blade is the negative image of the sipes and hidden tread blocks that are intended to be formed within a tire tread using said sipe blade.

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

DETAILED DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 6:
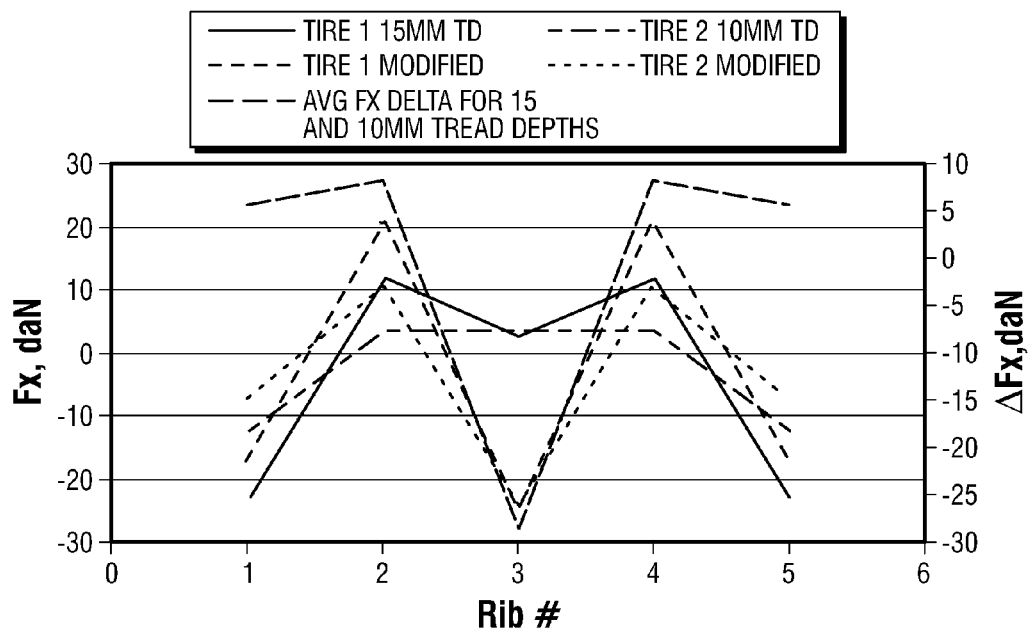

FIG. 6 is a graph showing the change of circumferential/longitudinal or Fx forces for various tire ribs on a tire sample when the tire had a 15 mm tread depth and no added sipes, when the tire had a 15 mm tread depth and added sipes, when the tire had a 10 mm tread depth and no sipes, when the tire had a 10 mm tread depth and added sipes, and the average change in circumferential or Fx forces when the sample is subjected essentially no driving/accelerating or braking/decelerating force.

Figure 7:
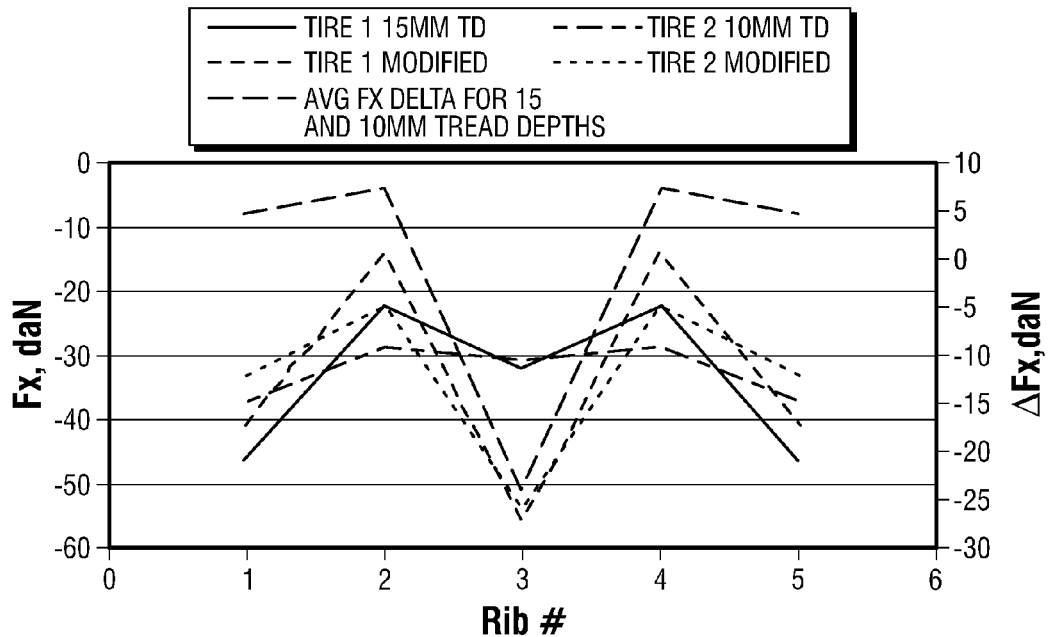

FIG. 7 is a graph showing the change of circumferential/longitudinal or Fx forces for various tire ribs on a tire sample when the tire had a 15 mm tread depth and no added sipes, when the tire had a 15 mm tread depth and added sipes, when the tire had a 10 mm tread depth and no sipes, when the tire had a 10 mm tread depth and added sipes, and the average change in circumferential or Fx forces when the sample is subjected to a braking or decelerating force.

Figure 8:
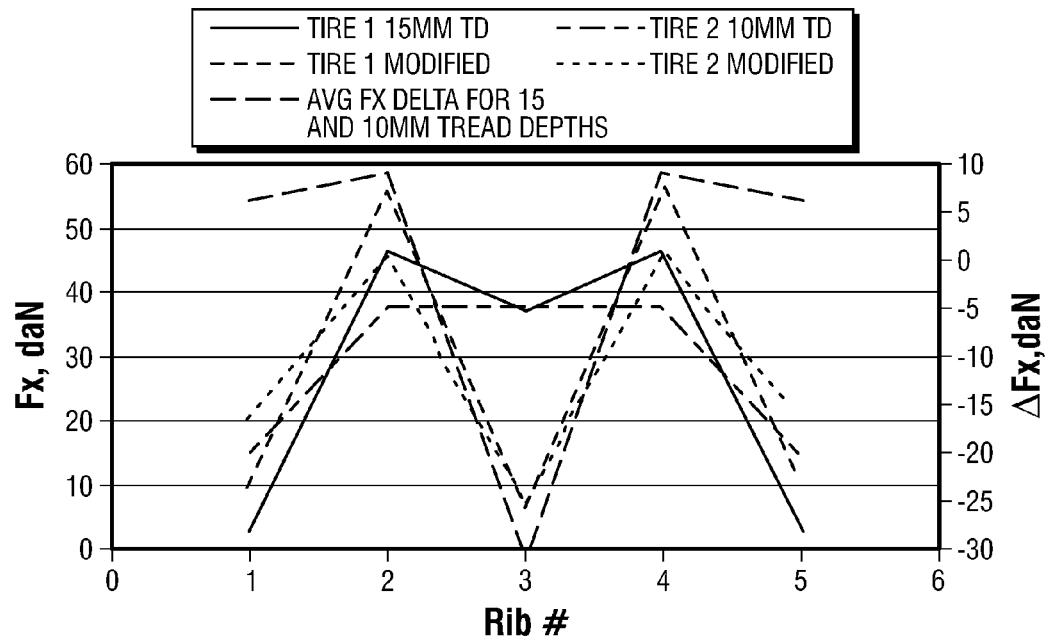

FIG. 8 is a graph showing the change of circumferential/longitudinal or Fx forces for various tire ribs on a tire sample when the tire had a 15 mm tread depth and no added sipes, when the tire had a 15 mm tread depth and added sipes, when the tire had a 10 mm tread depth and no sipes, when the tire had a 10 mm tread depth and added sipes, and the average change in circumferential or Fx forces when the sample is subjected to a driving or accelerating force.

DETAILED DESCRIPTION OF THE REPRESENTATIVE EMBODIMENTS

Reference will now be made in detail to embodiments of the invention, one or more examples of which are illustrated in the Figures. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. It should be noted that for the purposes of discussion, only a part of the exemplary tire embodiments may be depicted in one or more of the figures. Reference numbers are used in the Figures solely to aid the reader in identifying the various elements and are not intended to introduce any limiting distinctions among the embodiments. Common or similar numbering for one embodiment indicates a similar element in the other embodiments. One of ordinary skill in the art, using the teachings disclosed herein, will understand that the same or substantially similar features can be used on pneumatic, non-pneumatic and hybrid tires alike.

Figure 1:
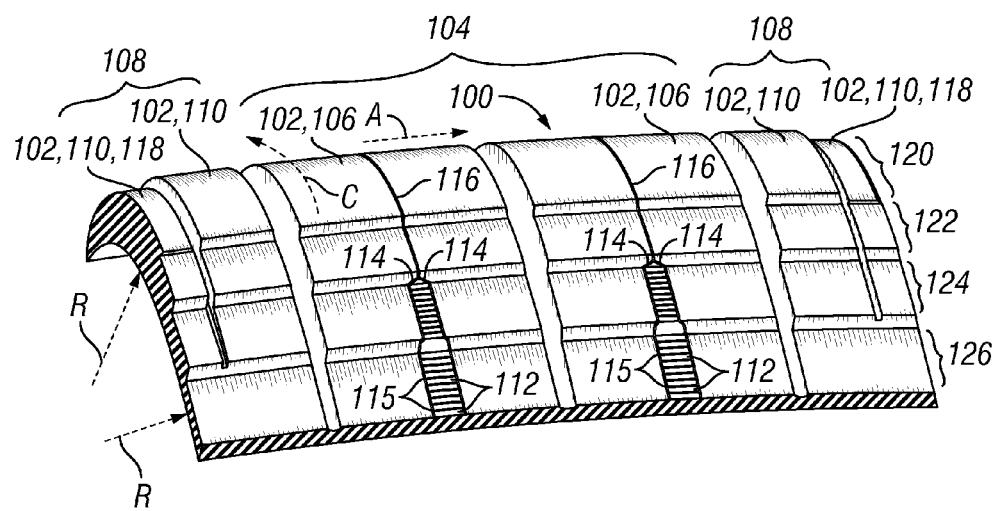
FIG. 1 is a perspective view of a portion of a tire tread that uses hidden tread blocks according to one embodiment of the present invention.
Figure 2:
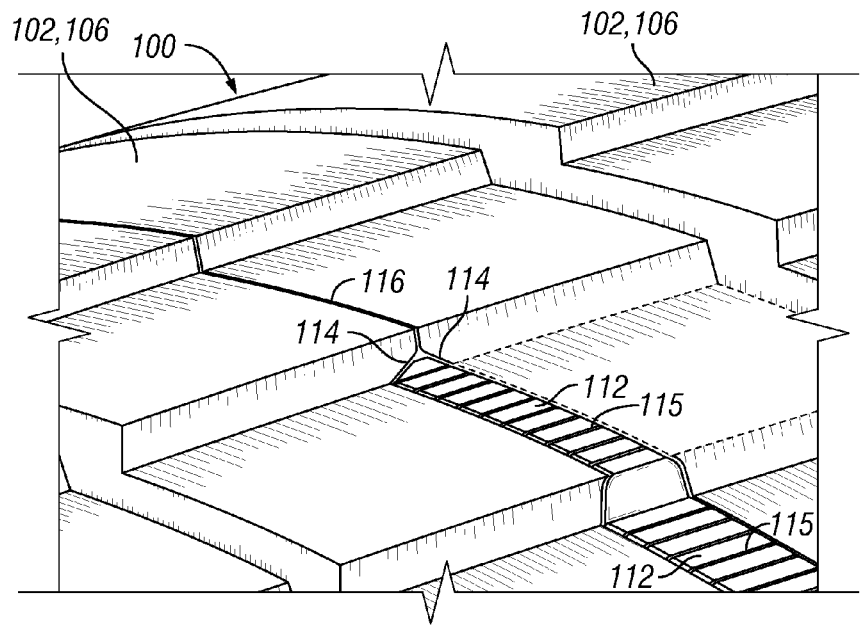
FIG. 2 is an alternate perspective view of the tread of FIG. 1.

Looking at FIGS. 1 and 2, a tire tread 100 with attributes according to a first embodiment of the present invention is shown with the rest of the tire being omitted for enhanced clarity. The tire tread is intended to be used on heavy truck steer and trailer tires. However, this invention is not limited to a particular sized tire or to a particular application and can be used on tires meant for virtually any application including applications for light trucks and passenger cars. The tire 100 defines circumferential C, axial A and radial R directions as well as a rotational axis (not shown) about which the tire rotates when used. The tire tread 100 also has a series of six ribs 102 that extend in the generally circumferential direction C of the tire. Although this embodiment of the present invention shows the uses of ribs, it is contemplated that the present invention could also be used on tread blocks as well.

Looking more closely at the ribs shown in FIG. 1, it can be seen that the ribs 102 are designed for different purposes. There is a center region 104 that includes the two middle ribs 106 and two shoulder regions 108 that include the outer four ribs 110. The ribs 106 of the center region 104 have a plurality of hidden sipes or tread blocks 112 that are separated from each other by dividing sipes 115 and that are also connected to outer surface or circumference of the tire tread 100 by two y-branched sipes 114 that lead to a long thin connecting sipe 116. The y-branched sipes 114 and connecting sipe 116 are generally oriented in the circumferential direction C of the tire tread 100 (as can be best seen in FIG. 2): The reason for this geometry will be described in more detail later.

On the other hand, the ribs 110 of the shoulder regions 108 do not have hidden sipes or tread blocks but instead include a sacrificial shoulder rib 118 for the prevention of irregular wear. This sacrificial rib 118 is a feature commonly found on tires and is relatively thin and slightly recessed as compared to the rest of the ribs of the tire tread and is known in the art for preventing the onset of irregular wear on the rest of the ribs of the tire. It should be noted that only a portion of the center and shoulder regions are shown in FIGS. 1 and 2 but that they in fact extend completely around the circumference of the tire. Also, typical tire features such as standard siping and lateral grooves are not shown to enhance clarity but could be used with the present invention if desired.

For the sake of illustration, the configuration of the tire tread is shown in different stages in FIGS. 1 and 2 to show how the tire tread 100 evolves as it wears, and exposes the hidden tread blocks 112. For example as best seen in FIG. 1, first stage 120, which corresponds to the topmost row of ribs shown in FIGS. 1 and 2, depicts how the tire tread 100 would look when the tire is first put in use. At this stage, the sacrificial ribs 118, remaining outer ribs 110 and middle ribs 106 are not worn at all. The middle ribs do not show any hidden tread blocks but only the long thin connecting sipe 116 that extends down from the outer circumference of the tire in the general radial direction R. At this stage, the sacrificial ribs along with any other irregular wear preventing mechanisms that may be employed on the tire tread 100 are sufficiently working. At second stage 122, which corresponds to the row of ribs found immediately below the first stage 120, all of the ribs including the sacrificial ribs 118 and middle ribs 106 are beginning to wear but the hidden tread blocks are not appearing yet. The third stage 124, is found below the second stage 122, and the sacrificial ribs 118 are almost gone so the hidden tread blocks 112 begin to appear for the purpose of changing the longitudinal tire contact force distribution in such a manner as to provide protection against irregular wear.

Of course, it is advantageous that the hidden tread blocks 112 begin to appear when other protective mechanisms loose their effectiveness. The fourth and last stage 126 shown is one where the sacrificial rib 118 has disappeared altogether as well as many if not all of the other irregular wear preventing mechanisms that may have been employed. Thus, the hidden tread blocks 112 are all that is left to prevent irregular wear as the tire becomes more worn. Of course, it is also advantageous that extra sipes appear to replace those that have disappeared in order to maintain traction.

Figure 3:
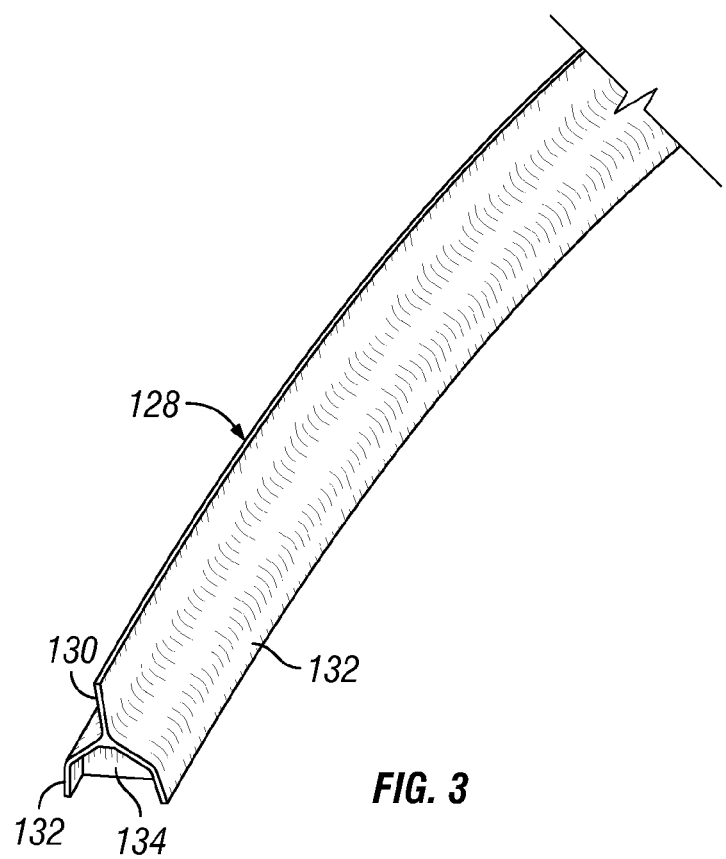
FIG. 3 is a top perspective view of a sipe blade used to form the tread blocks of the tire tread of FIG. 1.
Figure 4:
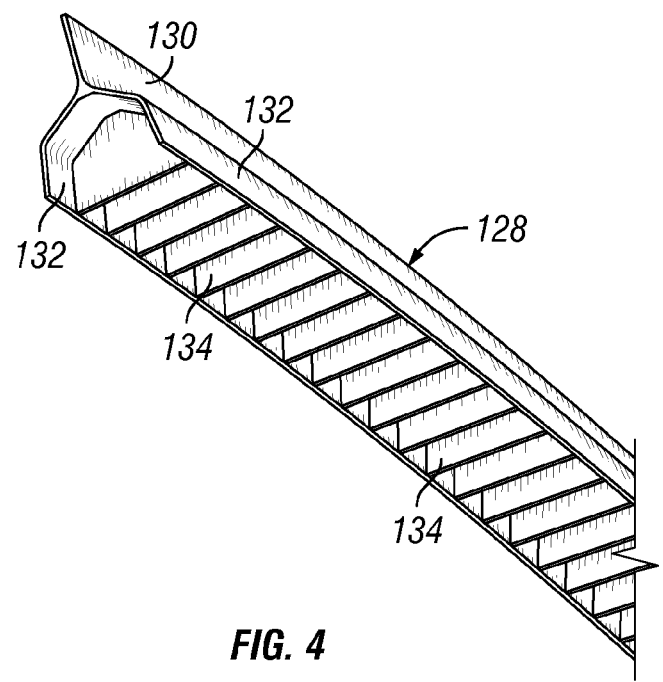
FIG. 4 is a bottom perspective view of the sipe blade of FIG. 3.

FIGS. 3 and 4 show a sipe or lamelle blade 128 that is used to make the hidden tread blocks 112 of the tire tread of FIGS. 1 and 2. As can been seen, the blade 128 is complimentary shaped to or is the negative shape of the long thin connecting sipe 116, y-branched sipes 114 and dividing sipes 115 that form the hidden tread blocks 112. Accordingly, the sipe blade 128 has a connecting member 130, y-branching members 132 and dividing members 134. The sipe blade 128 can be attached to a mold or retreading apparatus by means commonly known in the art that is used to form the tire tread 100 and can be manufactured by means commonly known in the art such as welding pieces of metal together, microcasting, metal laser sintering technology, etc. The sipe blade 128 typically has draft on it for molding and demolding the sipes. Also, the y-branching members 132 typically have holes (not shown) added to them for improving venting and molding. For this particular embodiment the connecting member 130 and dividing members 134 extend in a general radial direction R but can be angled from the radial direction R a predetermined amount provided the resulting geometry can be successfully molded and demolded. For example, the dividing members may be angled to provide some directionality to the tread blocks which can help prevent irregular wear. Likewise, the shape of the sipe blade could be changed so that it is not y-shaped and could extend in a direction that is not purely circumferential. Lastly, the thickness of these sipe blade members is 0.4 mm but could be altered as desired.

Figure 5:
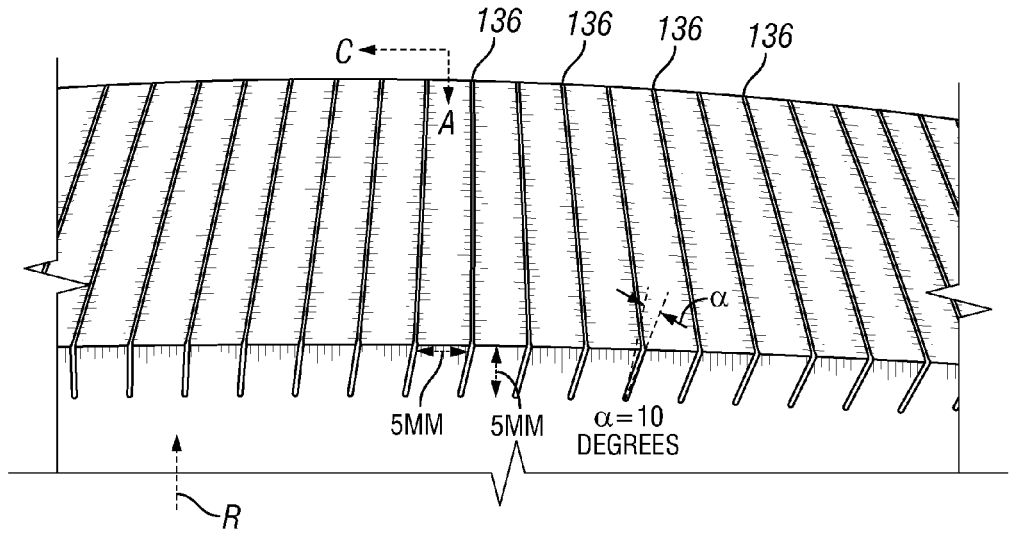
FIG. 5 is a perspective view of a tire sample with slits that approximate the effect of the hidden tread blocks according to one embodiment of the present invention to illustrate the utility of the present invention.

Tire test samples were created in order to test this concept out to see what effect siping could have on preventing irregular wear. FIG. 5 shows an example of a center rib of a tire to which small slits 136 were added to simulate the effect that hidden tread blocks would have on preventing irregular wear. The test tire was made by taking a slick or featureless tire and carving five ribs onto it with four straight circumferential grooves, creating a tire with a 15 mm tread depth. The longitudinal forces on the ribs were then determined using a test machine using a force transducer by means commonly known in the art for three different scenarios. The first scenario is when the tire is not nominally accelerating or decelerating, or in other words, nominally no driving or braking force is exerted on the tire. The second scenario is when the tire is subjected to a decelerating or braking force. The last or third scenario is when the tire is subjected to an accelerating or driving force.

Next as seen in FIG. 5, slits 136 that were tilted slightly in a positive circumferential direction C, which is the direction the tire rolls, to form an angle $\alpha$ from the radial direction R of the tire of approximately 10 degrees, were added to the center rib. This helps to increase the compliance of the rib, decreasing the longitudinal or Fx forces that the rib experiences. However, inclining the slits 136 is not essential to the present invention. The slits 136 were 5 mm deep and 5 mm apart in the circumferential direction C of the tire. Once again, the longitudinal forces were measured and recorded for the different scenarios described above.

After that, the tire was buffed to a tread depth of 10 mm, which effectively removed the previous slits 136 since they were only 5 mm deep. The longitudinal forces on all the ribs were then measured and recorded per the scenarios described above. Lastly, slits that were 5 mm deep and 5 mm apart in the circumferential direction C of the tire were added once more. Finally, the longitudinal forces on all the ribs were then measured and recorded per the scenarios described above. Then all the results were plotted in FIGS. 6-8 for the three different scenarios. It should be noted that Fy and Fz, or axial and radial forces remained essentially unchanged for each of the tire configurations and test scenarios.

Looking at FIG. 6, which shows the test results for the various states of the test tire when no accelerating or decelerating force was applied to the tire, it can be seen that modifying the center rib by adding slits 136 had a significant effect on the longitudinal forces on the ribs of the tire. For example, when the tire had no slits and 15 mm tread depth, the longitudinal force on the center rib (rib 3) was slightly positive at 2 daN while ribs to either side of the center rib (ribs 2 and 4) were also slightly positive at approximately 12 daN. After the tire had slits added to the center rib, the longitudinal force on the center rib dropped down to a negative 25 daN approximately while ribs 2 and 4 experienced a longitudinal force increase of 8 daN to a value of 20 daN. So the center rib experienced a tenfold decrease in longitudinal force while ribs 2 and 4 experienced a 50% increase in longitudinal force. Experienced tire designers consider a 5 daN change in longitudinal force on a heavy truck tire or a 3 daN change in longitudinal force on a passenger car or light truck tire to be significant in altering the wear pattern of a tire so these test results indicate that adding sipes is a bona fide way to improve irregular wear.

Looking at the same tire contained in FIG. 6 in a worn stage where the tread depth is 10 mm and the tire is tested with and without slits shows similar results. The longitudinal force exerted on the center went from a positive 2 daN to a negative 25 daN and the longitudinal force exerted on ribs 2 and 4 went from a positive 2 daN to a positive 10 daN. This supports the conclusion that having the hidden tread blocks appear as the tire wears is a viable way of altering the longitudinal force distribution of the tire in a manner that can inhibit the development of irregular wear. This ability to alter the longitudinal force distribution is exemplified by the curve that shows the average change in longitudinal force for the 15 mm and 10 mm tread depths for a siped and unsiped center rib. The change averaged approximately from a positive 5 to 8 daN for ribs 1, 2, 4 and 5 and a negative 28 daN for rib 3, which is significant.

Turning to FIG. 7, the test results for the same configurations of the tire for a scenario where a decelerating force is applied to a tire are shown. Although the absolute values for the longitudinal (Fx) forces are shifted negatively by approximately 30 daN, which can be attributed mostly to the negative or decelerating force that was exerted on the tire, the overall efficacy of adding slits to alter the longitudinal force distribution of the tire, and therefore affect the development of irregular wear remains. For example, the curve that shows the average change in longitudinal force for the different rib configurations is relatively unchanged.

Finally, looking at FIG. 8, when the same tire configurations were tested while a driving or accelerating force was applied to the tire, the test results were as expected with the change from rib to rib the same as for the previous two scenarios. The curves were shifted upward by approximately 30 daN. This can be attributed to the driving force that was applied to the tires.

As can be seen, the use of hidden tread blocks or sipes can help the prevention of irregular wear by increasing the positive longitudinal forces exerted on ribs as it is well known that positive longitudinal force provides some level of protection against irregular wear. Thus, the increase in longitudinal force will provide some irregular wear protection to the non-siped ribs. It is particularly advantageous that the hidden tread blocks or sipes appear as the tire wears and other mechanisms for preventing irregular wear lose their effectiveness, so that irregular wear may be prevented near the end of life of a tire while at the same time traction may be maintained or even enhanced due to the appearance of new sipes.

It should be understood that the present invention includes various other modifications that can be made to the exemplary embodiments described herein that come within the scope of the appended claims and their equivalents. These and other embodiments of the present invention are with the spirit and scope of the claims which follow.

What is claimed is:

1. A tire that includes circumferential, radial and axial directions and that has a tread with a plurality of tread blocks or ribs with improved resistance to wear problems comprising:
   a first tread block or tread rib having hidden sipes or hidden tread blocks when the tread is unworn; and
   a second tread block or tread rib that is adjacent the first tread block or tread rib;
   wherein the hidden tread blocks are formed by Y-branched sipes and dividing sipes.

2. A tire that includes circumferential, radial and axial directions and that has a tread with a plurality of tread ribs wherein at least one rib has a sipe that extends substantially in the circumferential direction of the tire when the tread is unworn, wherein said tire further comprises y-branched sipes that extend from the circumferentially oriented sipe wherein said y-branched sipes are exposed as the tire wears, wherein said tire further comprises dividing sipes that connect from one y-branched sipe to another y-branched sipe, forming hidden tread blocks that are exposed as the tire wears.

3. The tire according to claims 1 or 2 wherein said dividing sipes are titled slightly toward the direction circumferentially in which the tire rolls.

4. The tire according to claim 3 wherein the angle the dividing sipes form with the radial direction of the tire is approximately ten degrees.

5. The tire according to claim 2 wherein the dividing sipes are spaced approximately 5 mm away from each other in the circumferential direction of the tire.

6. The tire according to claims 1 or 2 wherein said dividing sipes are 5 mm deep in the radial direction of the tire.

7. The tire according to claims 1 or 2 wherein the dividing sipes are substantially straight.

8. The tire according to claim 1 or 2 wherein said tread has a depth in the radial direction that ranges from 10 to 15 mm.

9. The tire according to claim 1 or 2 wherein the tire is a heavy truck tire and the tread depth is greater than 15 mm in the radial direction.

10. The tire according to claim 2 wherein said plurality of tread ribs run in the circumferential direction of the tire and at least one of the ribs found in the middle region of the tire has hidden tread blocks or hidden sipes.

* * * * *